(12) United States Patent
Takayanagi et al.

(10) Patent No.: US 7,328,909 B2
(45) Date of Patent: Feb. 12, 2008

(54) TOWER CONNECTING BAR STRUCTURE

(75) Inventors: Taku Takayanagi, Wako (JP); Takeshi Yamaguchi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 396 days.

(21) Appl. No.: 11/191,884

(22) Filed: Jul. 28, 2005

(65) Prior Publication Data

US 2006/0027993 A1 Feb. 9, 2006

(30) Foreign Application Priority Data

Aug. 3, 2004 (JP) ............................. 2004-227099

(51) Int. Cl.
*B62D 25/08* (2006.01)
(52) U.S. Cl. .................... 280/124.106; 280/124.152; 280/124.155; 280/124.107; 280/124.147
(58) Field of Classification Search ......... 280/124.106, 280/124.152, 124.155, 124.166
See application file for complete search history.

(56) References Cited

U.S. PATENT DOCUMENTS

| | | | |
|---|---|---|---|
| 5,484,161 A | * | 1/1996 | McIntyre ............. 280/124.155 |
| 6,244,607 B1 | * | 6/2001 | Nishino ............... 280/124.107 |
| 6,485,223 B1 | * | 11/2002 | Van Schmus et al. ... 403/408.1 |
| 6,773,057 B2 | * | 8/2004 | Nomura ...................... 296/198 |
| 7,055,837 B2 | * | 6/2006 | Noble ................. 280/124.155 |
| 2005/0218618 A1 | * | 10/2005 | Carlson ................ 280/86.751 |

FOREIGN PATENT DOCUMENTS

| | | |
|---|---|---|
| JP | 62-100270 | 6/1987 |
| JP | 4-9267 | 3/1992 |
| JP | 06087465 A * | 3/1994 |
| JP | 2002308149 A * | 10/2002 |

OTHER PUBLICATIONS www.tanabe-usa.com/strutbars, copyright 2002.*

* cited by examiner

*Primary Examiner*—Jøe H. Cheng
*Assistant Examiner*—Nicole Verley
(74) *Attorney, Agent, or Firm*—Rankin, Hill, Porter & Clark LLP

(57) ABSTRACT

A structure of removably mounting a tower connecting bar between top surfaces of right and left strut towers by bolts and nuts. The tower connecting bar has a pipe and annular circular plates attached to opposite ends of the pipe. The circular plates are mounted to the top surfaces of the towers by the bolts and nuts. Upper ends of suspension struts are fastened to the top surfaces of the towers by bolts and nuts. The circular plates have through holes for allowing the strut-mounting nuts to escape when the towers and circular plates are mated together. The through holes provide access to loosen the strut-mounting nuts.

4 Claims, 10 Drawing Sheets

TOWER CONNECTING BAR STRUCTURE

This application claims the foreign priority of Japanese Application Serial No. JP 2004-227099, filed on Aug. 3, 2004, and is incorporated by reference into this application.

FIELD OF THE INVENTION

The present invention relates to a tower connecting bar structure in which the upper ends of right and left suspension struts are connected to mounting portions on the vehicle body side.

BACKGROUND OF THE INVENTION

A structure in which the ends of a rod are mounted to right and left body portions, respectively, in an automobile engine compartment is proposed in Japanese Utility Model Laid-Open Publication No. HEI-4-9267, for example. A structure in which top surfaces of right and left suspension towers are connected by a rod is proposed in Japanese Utility Model Laid-Open Publication No. SHO-62-100270, for example.

A performance rod mounting structure proposed in HEI-4-9267 will be described with reference to FIG. 12; a performance rod mounting structure proposed in SHO-62-100270 will be described with reference to FIG. 13.

A performance rod 101 shown in FIG. 12 is mounted in an engine compartment E. A first end 102 of the rod 101 is supported by a body portion 103 via a horizontal bolt 104. A second end 105 is supported by a body portion 107 via a vertical bolt 106. When the vertical bolt 106 is pulled out of a bracket 108, the rod 101 becomes rotatable about the horizontal bolt 104 as shown by arrow R. This provides enough space in the engine compartment E for maintenance of parts disposed in the engine compartment E.

A performance rod 131 shown in FIG. 13 is connected to right and left suspension towers 133 (only one shown) of a vehicle 132. An end of the performance rod 131 is welded to a plate or sheet bracket 135 abutting a top surface 134 of the suspension tower 133. The plate bracket 135 has a through hole 136 and three mounting holes. The plate bracket 135 is fastened to the top surface 134 together with a suspension damper D. This prevents the top surface 134 of the suspension tower 133 from being deformed when it is subjected to vibration forces from the suspension damper D.

However, since the first and second ends 102 and 105 of the performance rod 101 shown in FIG. 12 are mounted in positions apart from upper ends 111, 111 of a suspension, loads applied from the suspension are hardly transmitted to the performance rod 101 via the body portions 103 and 107. Thus, the performance rod 101 cannot efficiently receive the loads.

The performance rod 131 shown in FIG. 13 effectively supports a load applied to the suspension damper D. However, when nuts are loosened to remove the performance rod 131 for inspection and maintenance, the suspension damper D is also disengaged from the suspension tower 133, resulting in time-consuming inspection and maintenance. On the other hand, when the suspension damper D is disengaged, the performance rod 131 is also disengaged, resulting in time-consuming inspection and maintenance.

Further, since the plate bracket 135 is placed on the top surface 134 of the suspension tower 133 and fastened together as shown in FIG. 13, factors affecting axial forces (e.g., contact conditions such as an area size and a clearance size) are increased and are likely to increase variations in axial force. Furthermore, when a load acts on the plate bracket 135, a connection portion 137 to the performance rod 131 is likely to deform.

There is thus demand for a tower connecting bar structure which efficiently receive loads from suspension struts, reduces variations in axial force when upper ends of the suspension struts are fastened, and saves time in mounting and removing.

SUMMARY OF THE INVENTION

According to the present invention, there is provided a tower connecting bar structure for connecting right and left strut towers on which bolts and nuts for suspension fastening are exposed, which comprises: a tower connecting bar comprising a pair of right and left doughnut-shaped circular plates, and a pipe which connects the circular plates; the circular plates including a plurality of bolt holes formed to be used for fastening the circular plates to the strut towers, and a plurality of nut accommodating or escaping holes formed greater in diameter than the outside diameter of the nuts.

As described above, the tower connecting bar in this invention comprises the pair of right and left doughnut-shaped circular plates and the pipe which connects the circular plates, and the circular plates are formed with the nut accommodating holes having a diameter greater than the outside diameter of the suspension-fastening nuts as well as the bolt holes used for fastening the circular plates to the strut towers. There is an advantage that the bolt holes for fastening the circular plates can thus be used for directly mounting the tower connecting bar to the strut towers to allow it to efficiently receive loads from suspension struts. When the circular plates are mounted to the strut towers, the suspension-fastening nuts are accommodated in the nut accommodating holes. There is an advantage that the surface pressures of the suspension—fastening nuts can be directly applied to the strut towers, reducing variations in axial force when the upper ends of the suspension struts are fastened.

The circular plates are formed with the nut accommodating holes as well as the bolt holes used for fastening the circular plates to the strut towers. Therefore, when the circular-plate-mounting nuts are loosened to remove the tower connecting bar for inspection and maintenance, for example, the suspension struts are not disengaged from the strut towers. This saves time in mounting and removing the tower connecting bar.

The bolt holes formed in one of the right and left circular plates are circular holes, and the bolt holes formed in the other circular plate are transversely elongated holes. The elongated holes can absorb pitch variations between the right-hand and left-hand bolts used for fastening the circular plates, preventing interference between the circular-plate bolts and the bolt holes.

Substantially triangular reinforcing brackets are placed on connection portions between the pipe and the circular plates, and the reinforcing brackets are formed with tool holes through which to pass a nut fastening tool. The reinforcing brackets can thus increase the strength (section modulus) of the connection portions between the pipe and the circular plates to efficiently receive forces from the suspension struts of a suspension.

The pipe is provided with branch pipes attached to its middle. The branch pipes have distal ends mountable to a cowl below a windshield. When forces from the suspension struts are applied to the strut towers, the branch pipes can transmit the forces to the cowl, increasing the strength of the tower connecting bar, and resultantly increasing the strengths of the strut towers.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
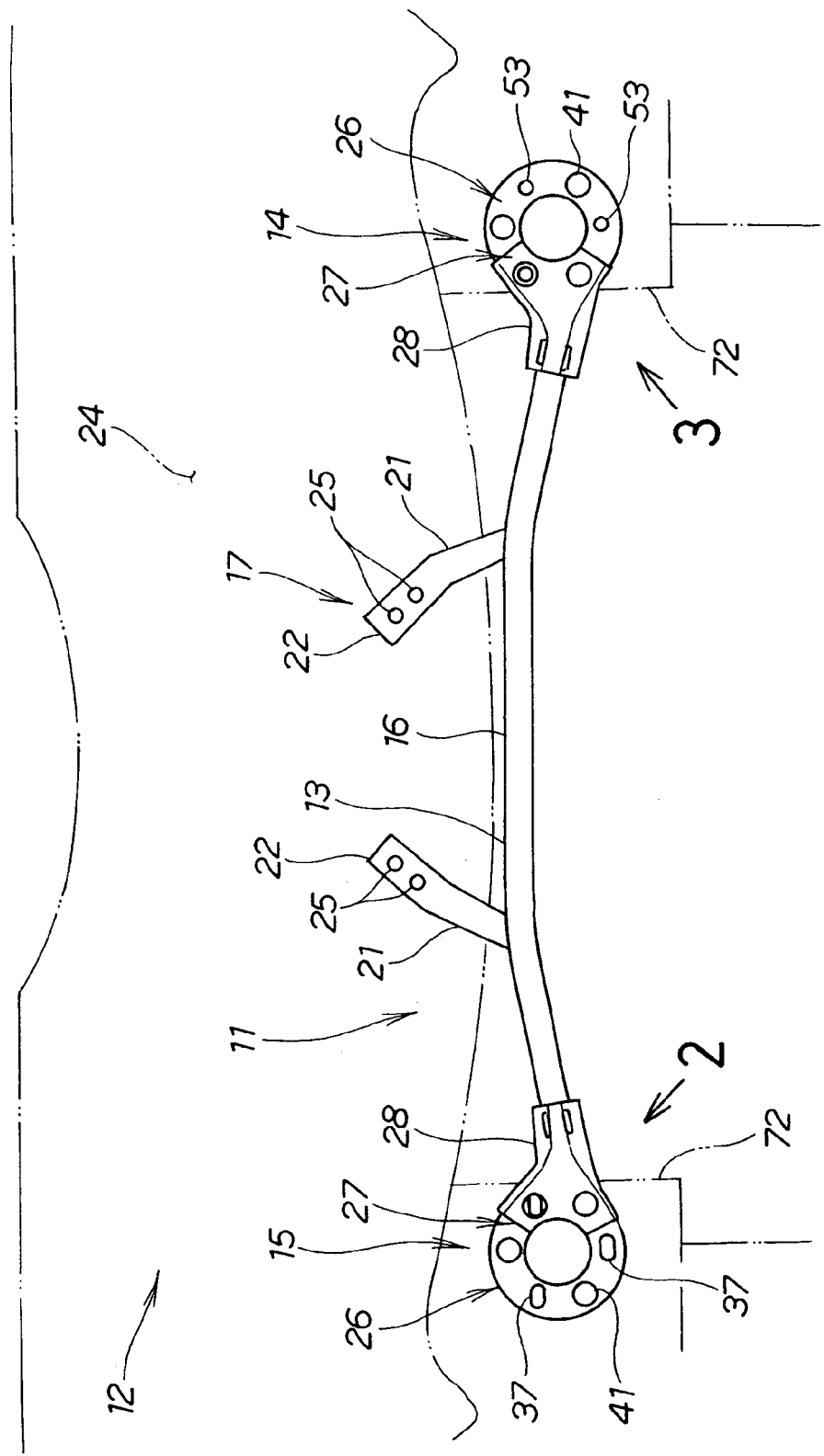
FIG. 1 is a schematic plan view of a tower connecting bar structure according to the present invention.

In the description of an embodiment with reference to the drawings, "front," "rear," "right," "left," "above" and "below" shown in the drawings are directions seen from a driver.

A tower connecting bar 11 shown in FIG. 1 includes a pipe 13 extending transversely of a vehicle 12, annular brackets 14 and 15 fixed to opposite ends of the pipe 13, and branch pipes 17 attached to the middle 16 of the pipe 13.

The branch pipes 17 include a pair of right and left pipe bodies 21, 21 attached symmetrically with respect to the middle 16 of the pipe 13. The right and left pipe bodies 21, 21 have distal ends 22, 22 formed with a plurality of holes 25 for mounting to a cowl 24 below a windshield.

The bracket 14 has a doughnut-shaped circular plate 26 to which a substantially triangular reinforcing bracket 27 is attached. Reference numerals 28, 28 denote connection portions between the pipe 13 and the circular plates 26.

Although the tower connecting bar 11 herein includes the branch pipes 17 and the reinforcing brackets 27, it is possible to eliminate the branch pipes 17 and the reinforcing brackets 27. That is, the tower connecting bar 11 may consist of the pair of right and left doughnut-shaped circular plates 26 and the pipe 13 connecting the circular plates 26.

The right bracket 15 has main components similar to the bracket 14.

Figure 2:
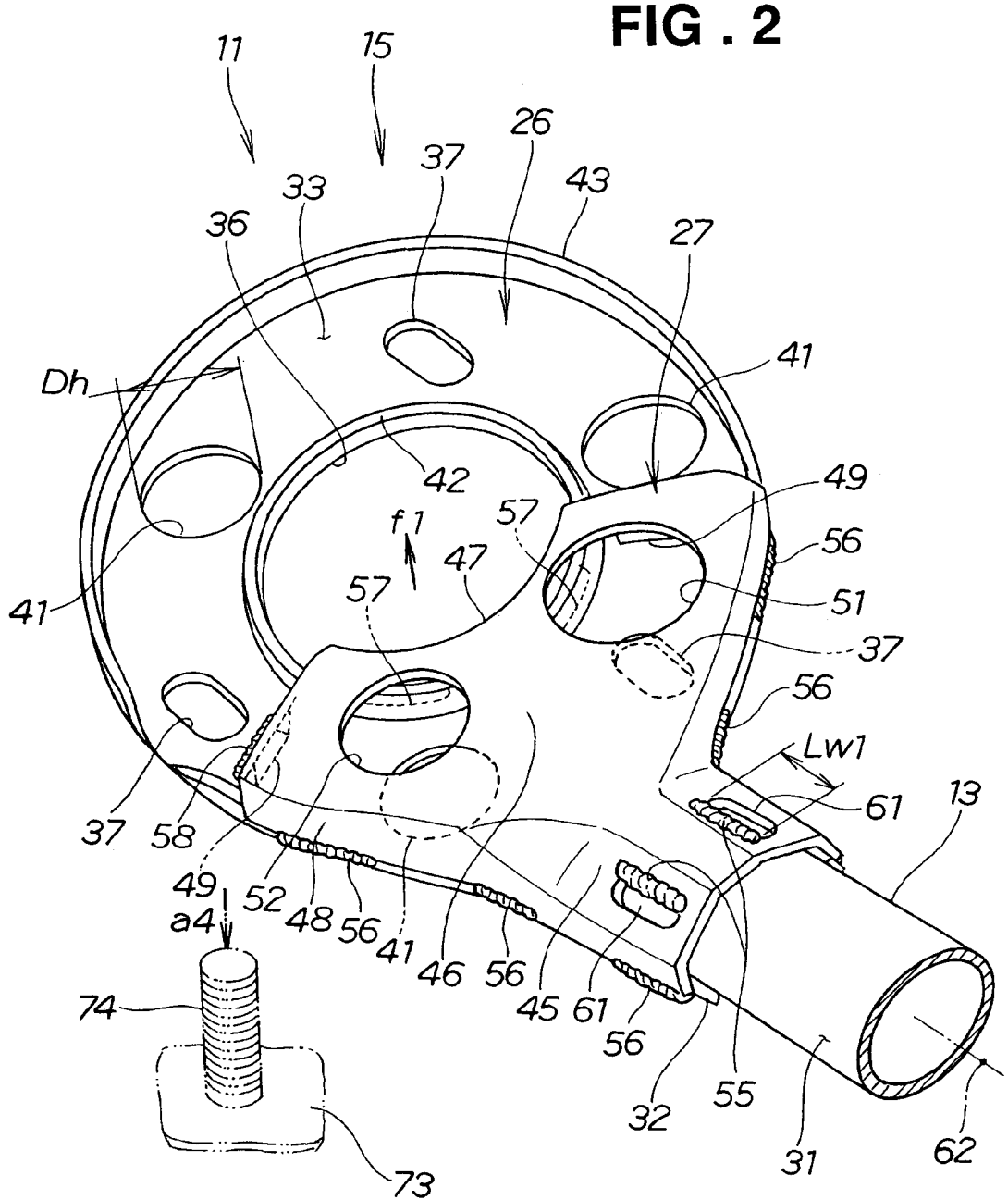
FIG. 2 is a perspective view illustrating the connection between a right bracket and a pipe, as viewed in the direction of arrow 2 of FIG. 1.

FIG. 2 shows the right bracket 15 of the tower connecting bar 11.

The bracket 15 has the doughnut-shaped circular plate 26 to which the reinforcing bracket 27 is attached, as already described.

The right circular plate 26 includes a fitting portion 32 conformed to an outer surface 31 of the pipe 13, into which the pipe 13 is fitted, and a fastening plate portion 33 formed continuously with the fitting portion 32.

The fastening plate portion 33 has in its center a strut hole 36 in which an upper end 35 (see FIG. 8) of a suspension strut 34 (see FIG. 10) is disposed, three bolt holes 37 and three nut accommodating or escaping holes 41 formed around the periphery of the strut hole 36, and ribs 42 and 43 formed at the inner and outer peripheries of the fastening plate portion 33.

The bolt holes 37 are transversely elongated.

The diameter Dh of the nut accommodating holes 41 is greater than the outside diameter Dn (see FIG. 9) of suspension-fastening nuts 44 (see FIG. 9) (Dh>Dn).

The reinforcing bracket 27 includes a first reinforcing portion 45 conformed to the outer surface 31 of the pipe 13 and fitted to the fitting portion 32 of the circular plate 26, and a second reinforcing portion 46 formed continuously with the first reinforcing portion 45. The second reinforcing portion 46 includes a rib 47 formed at a circular arc portion at its distal middle portion, ribs 48 formed at its opposite sides, and ribs 49, 49 formed at its distal end portions on both sides of the circular arc portion.

The second reinforcing portion 46 of the reinforcing bracket 27 is formed with tool holes 51 and 52 through which to pass a nut fastening tool (not shown).

Figure 3:
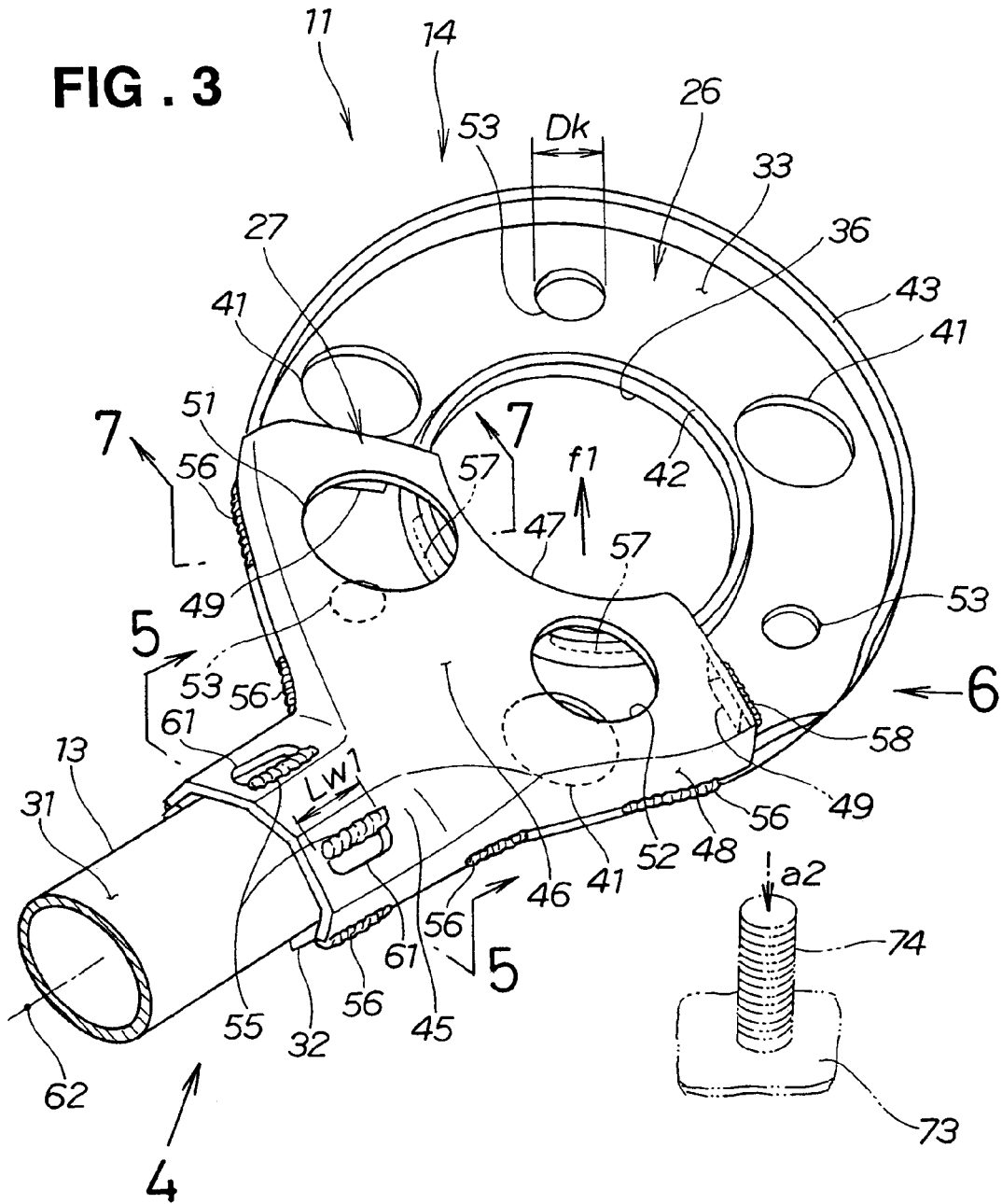
FIG. 3 is a perspective view illustrating the connection between a left bracket and a pipe, as viewed in the direction of arrow 3 of FIG. 1.

FIG. 3 shows the left bracket 14 shown in FIG. 1.

The bracket 14 includes, as already described, the doughnut-shaped circular plate 26 and the reinforcing bracket 27 attached to the circular plate 26.

The left circular plate 26 includes a fitting portion 32 conformed to the outer surface 31 of the pipe 13 and fitted onto the pipe 13, and a fastening plate portion 33 formed continuously with the fitting portion 32.

The fastening plate portion 33 includes in its center a strut hole 36 in which an upper end 35 (see FIG. 8) of a suspension strut 34 (see FIG. 10) is disposed, three bolt holes 53 and three nut accommodating holes 41 formed around the periphery of the strut hole 36, and ribs 42 and 43 formed at the inner and outer peripheries of the fastening plate portion 33.

The bolt holes 53 are circular holes with the diameter set at Dk.

The reinforcing bracket 27 includes a first reinforcing portion 45 conformed to the outer surface 31 of the pipe 13 and fitted to the fitting portion 32 of the circular plate 26, and a second reinforcing portion 46 formed continuously with the first reinforcing portion 45. The second reinforcing portion 46 includes a rib 47 formed at a circular arc portion at its distal middle portion, ribs 48 formed at its opposite sides, and ribs 49, 49 formed at its distal end portions on both sides of the circular arc portion.

The second reinforcing portion 46 of the reinforcing bracket 27 is formed with tool holes 51 and 52 through which to pass a nut fastening tool (not shown).

The tower connecting bar 11 is a combination of the pipe 13, the doughnut-shaped circular plates 26 and the reinforcing brackets 27 which are integrated by welding. The doughnut-shaped circular plates 26 are attached to the outer surface 31 of the pipe 13 at welds (such as beads) 54, 54 (see FIG. 4). The reinforcing brackets 27 are attached to the outer surface 31 of the pipe 13 at welds 55, 55. The reinforcing brackets 27 are also attached to the doughnut-shaped circular plates 26 at welds 56, 57 and 58.

Specifically, each reinforcing bracket 27 includes at the first reinforcing portion 45 grooves 61, 61 formed in the direction of the central axis 62 of the pipe 13. A weld (such as a bead) 55 is applied to each beveled portion 61 for weld length Lw1 to increase the strength of the weld 55. The strength is especially increased against a load generally orthogonal to the central axis 62 (in the direction of arrow f1), resulting in an increased strength of the reinforcing bracket 27.

Figure 4:
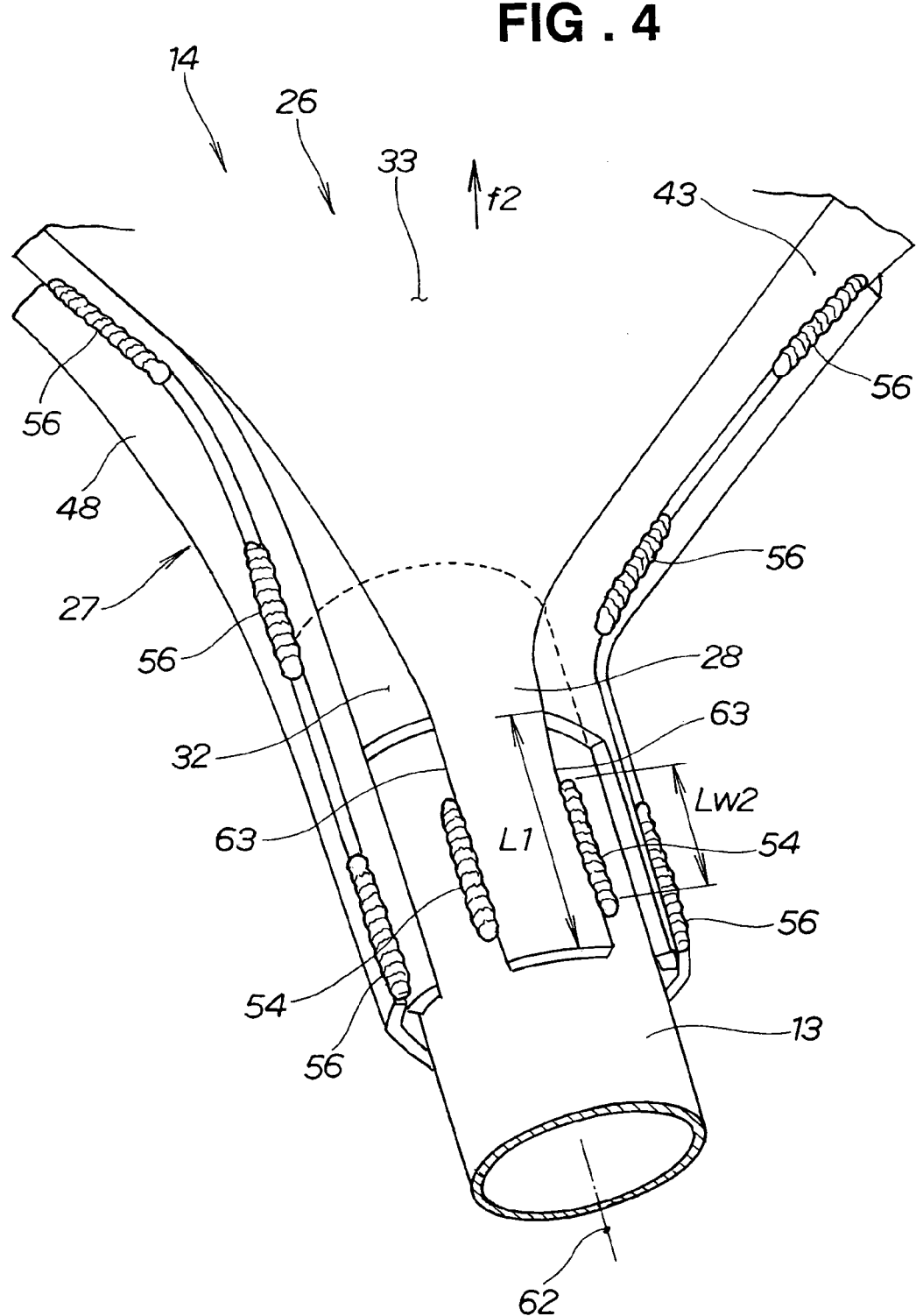
FIG. 4 is a perspective view illustrating the connection between a connection portion of the right bracket and the pipe, as viewed in the direction of arrow 4 of FIG. 3.

FIG. 4 shows the left bracket 14 viewed from the bottom.

The circular plate 26 includes grooves 63, 63 formed at the fitting portion 32 over length L1 in the direction of the central axis 62 of the pipe 13. As a result, welds (such as beads) 54 can be applied to the grooves 63, 63 for weld length Lw2 to increase the strength of the welds 54. The strength can be especially increased against a load generally orthogonal to the central axis 62 (in the direction of arrow f2), resulting in an increased strength of the circular plate 26.

The bracket 14 has the ribs 48 of the reinforcing bracket 27 attached to the rib 43 at the outer periphery of the doughnut-shaped circular plate 26 by a plurality of welds 56 of fillet welds, and thus can be welded in a constant weld position during welding, resulting in easy and time-saving welding.

Figure 5:
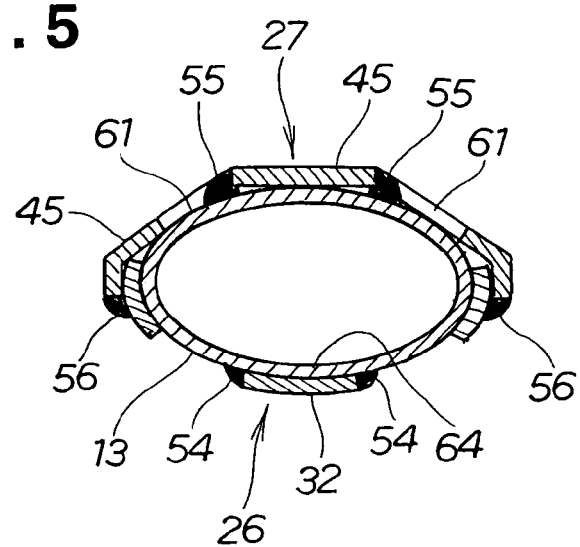
FIG. 5 is a cross-sectional view taken along line 5-5 of FIG. 3

FIG. 5 shows a cross section of the pipe 13, a cross section of the fitting portion 32 of the circular plate 26, and a cross section of the first reinforcing portion 45 of the reinforcing bracket 27.

The pipe 13 has an elliptical cross-sectional shape. The pipe 13 is disposed with a short-diameter portion 64 formed with a short diameter oriented vertically. Thus, the height of the pipe 13 is low, ensuring a clearance between the pipe 13 and a hood (not shown).

Figure 6:
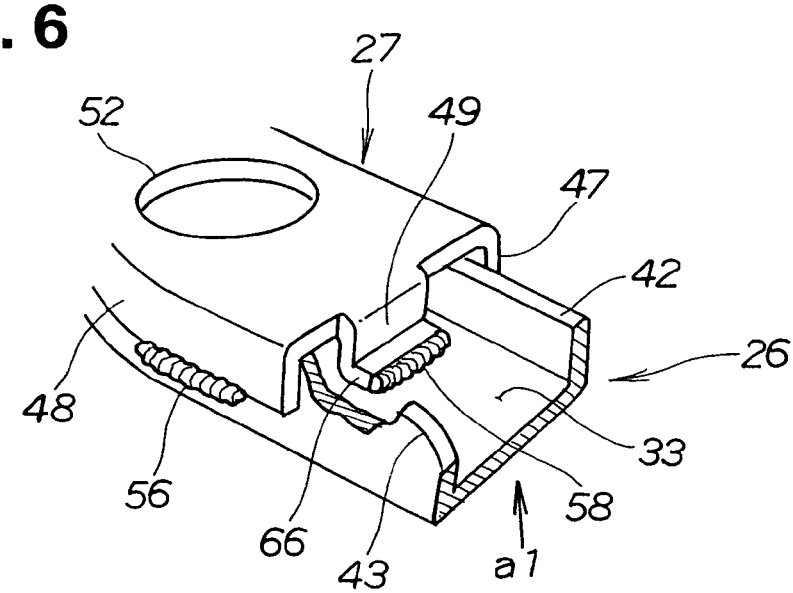
FIG. 6 is a view taken in the direction of arrow 6 of FIG. 3.

FIG. 6 shows one end portion of the reinforcing bracket 27 shown in FIG. 3.

The reinforcing bracket 27 has the rib 49 at that end portion. The rib 49 has an abutting portion 66. The abutting portion 66 abuts on the top surface of the fastening plate portion 33 of the circular plate 26.

The abutting portion 66 of the reinforcing bracket 27 can distribute a load applied to the circular plate 26 in an upward direction (direction of arrow a1), reducing the surface pressure on the rib 49, and resultantly reinforcing the circular plate 26 more securely.

Figure 7:
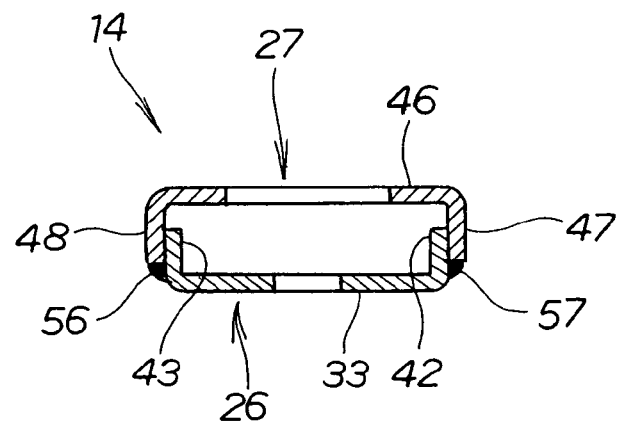
FIG. 7 is a cross-sectional view taken along line 7-7 of FIG. 3

FIG. 7 shows a cross section of a part of the annular bracket 14 shown in FIG. 3.

The bracket 14 has a structure in which the ribs 47 and 48 formed at the edge of the second reinforcing portion 46 of the reinforcing bracket 27 are integrally joined to the ribs 42 and 43 formed at the inner and outer peripheries of the circular plate 26 at the welds 56 and 57. This can increase the strength (section modulus) of the circular plate 26.

Figure 8:
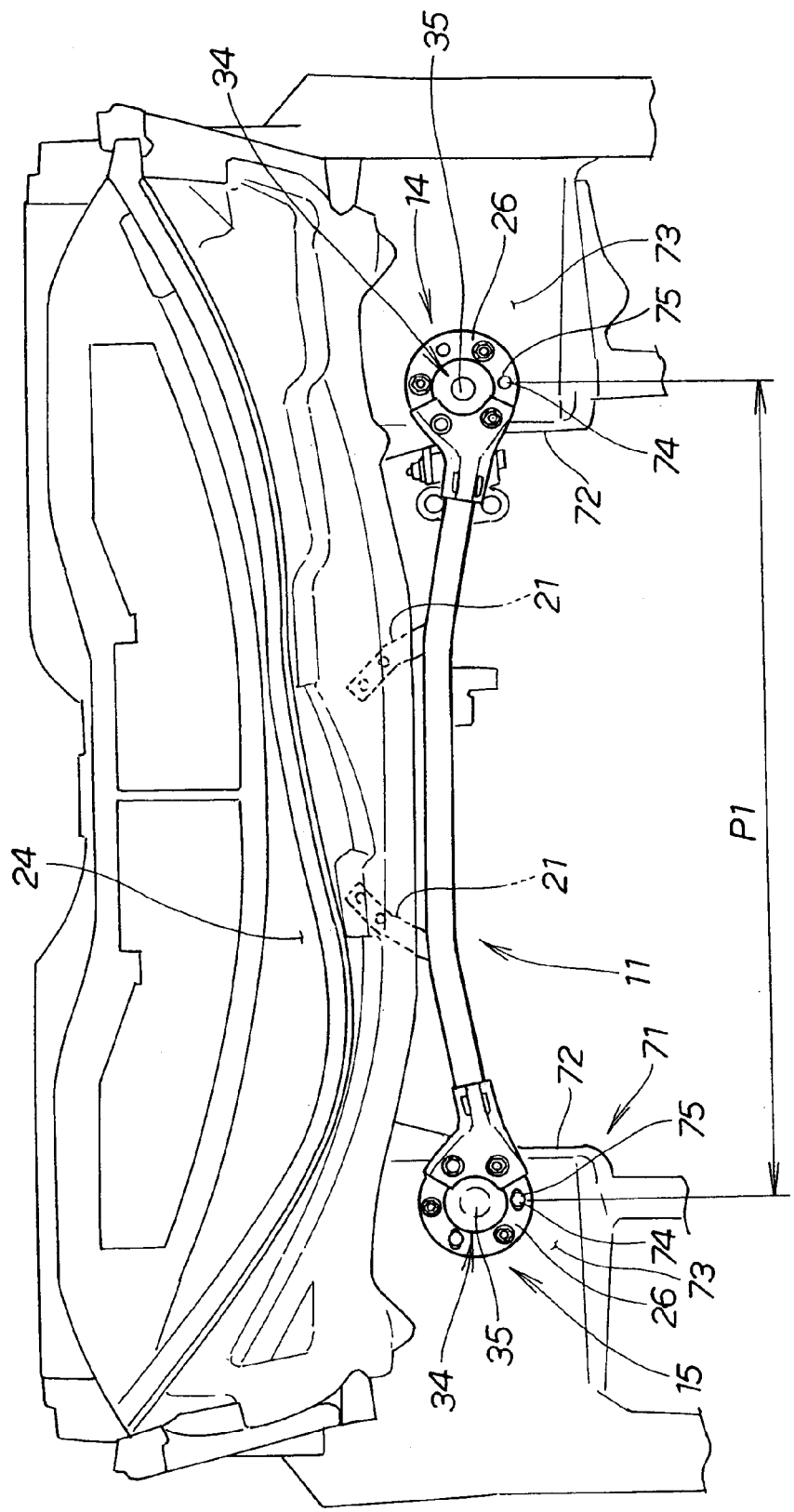
FIG. 8 is a plan view of a tower connecting bar according to the present invention, mounted to right and left strut towers.

As shown in FIG. 8, the tower connecting bar 11 is assembled by mounting the left and right brackets 14 and 15 by a plurality of bolts 74 and nuts 75 to top plate portions 73, 73 of the right and left strut towers 72, 72 provided on the vehicle body 71 side.

Figure 9:
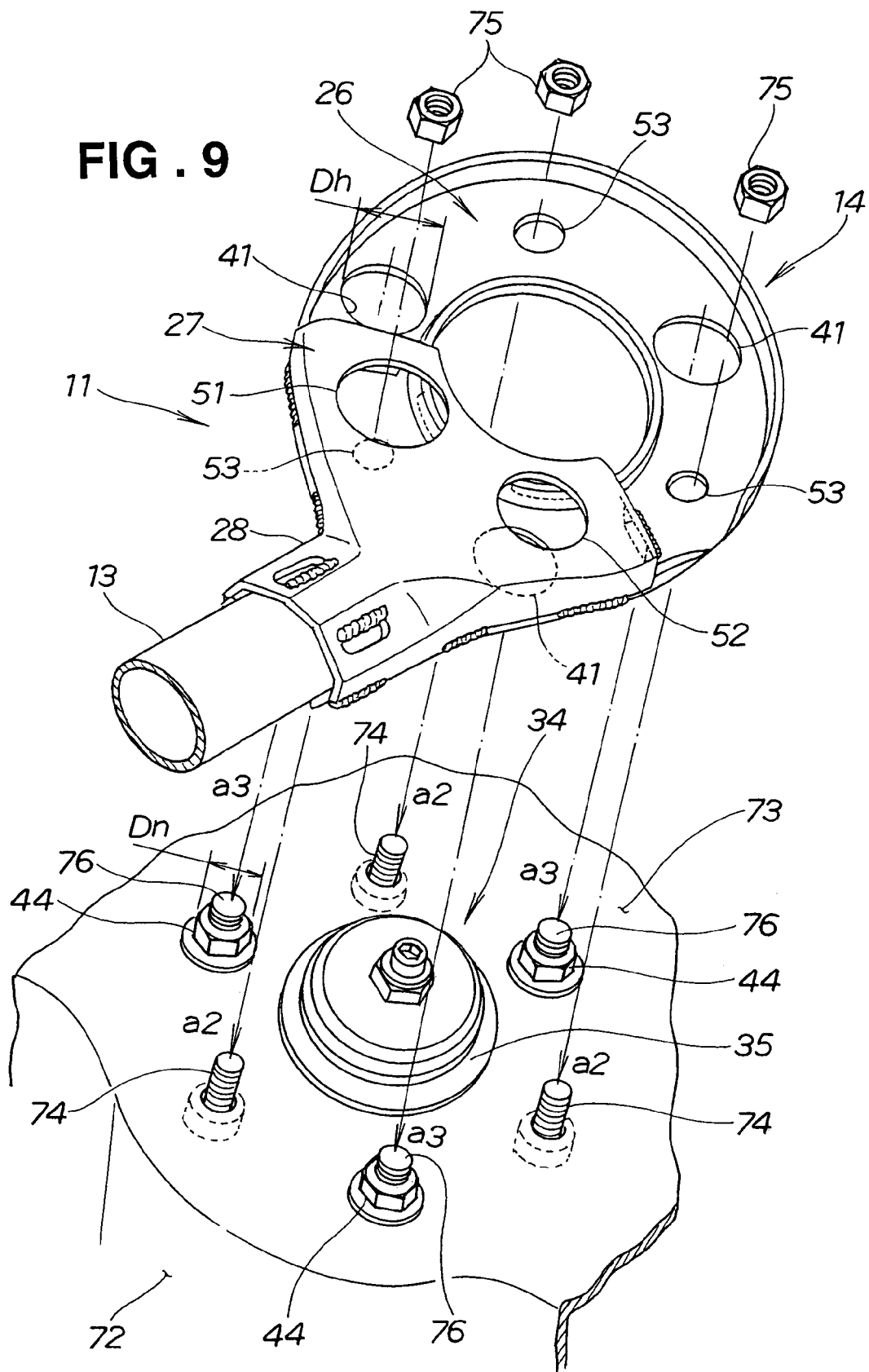
FIG. 9 is a perspective view illustrating mounting of the left bracket to the strut tower.

The upper ends 35, 35 of the right and left suspension struts 34, 34 are previously mounted to the top plate portions 73, 73 of the strut towers 72, 72 by a plurality of suspension-fastening bolts 76 (see FIG. 9) and nuts 44 (see FIG. 9).

Since the brackets 14 and 15 (circular plates 26) are thus mounted to the top plate portions 73, 73 of the strut towers 72, 72, the top plate portions 73, 73 of the strut towers 72, 72 can be directly supported to efficiently receive loads F (see FIG. 10) from the suspension struts 34, 34.

FIG. 9 shows mounting of the tower connecting bar 11 to the strut tower 72.

The upper end 35 of the suspension strut 34 is previously fastened to the top plate portion 73 of the strut tower 72 by the bolts 76 and nuts 44. Thus, the circular plate 26 of the tower connecting bar 11 does not intervene between the nuts 44 and the top plate portion 73, and the surface pressures of the nuts 44 can be applied only to the top plate portion 73.

More specifically, the circular plate 26 is formed with the nut accommodating holes 41 of a diameter (diameter Dh) greater than the outside diameter Dn of the nuts 44, in addition to the bolt holes 53 or the bolt holes 37 of elongated holes (see FIG. 2) used for fastening the circular plate 26 to the strut tower 72. Consequently, the circular plate 26 of the tower connecting bar 11 does not intervene between the nuts 44 and the top plate portion 73, which can reduce variations in axial force applied to the bolts 76 for fastening the upper end 35 of the suspension strut 34 to the top plate portion 73.

Next, the mounting procedure of the tower connecting bar 11 will be described.

First, the suspension strut 34 is fastened to the top plate portion 73 of the strut tower 72. Then, the three bolts 74 previously fixed by welding to the top plate portion 73 of the strut tower 72 are inserted through the three bolt holes 53 formed in the circular plate 26, respectively, as shown by arrows a2, as well as the three nuts 44 being inserted through the three nut accommodating holes 41, respectively, as shown by arrows a3.

Subsequently, the right three bolts 74 are inserted through the three bolt holes 37 of elongated holes (see FIG. 2) formed in the right circular plate 26, respectively, as shown by arrow a4 (see FIG. 2), as well as the three nuts 44 being inserted through the three nut accommodating holes 41, respectively, as shown by arrows a3.

In this procedure, the use of the elongated holes 37 can absorb variations in pitch (e.g., pitch P1 shown in FIG. 8) between the bolts 74 welded to the top plate portions 73. Subsequently, the right and left nuts 75 are screwed onto the bolts 74, respectively, to fasten the right and left circular plates 26 to the top plate portions 73 of the right and left strut towers 72.

As shown in FIG. 9, the circular plate 26 is formed with the nut accommodating holes 41 in addition to the bolt holes 53 or the bolt holes 37 of elongated holes (see FIG. 2), and the top plate portion 73 of the strut tower 72 is formed with the bolts 74 for circular plate mounting. Therefore, when the right and left nuts 75 are loosened to remove the tower connecting bar 11 for inspection and maintenance, for example, the suspension struts 34 (see FIG. 10) are not disengaged from the top plate portions 73 of the strut towers 72. On the other hand, when the nuts 44 are loosened to remove the suspension struts 34, the tower connecting bar 11 is not disengaged from the top plate portions 73 of the strut towers 72. This saves time in mounting and removing the tower connecting bar 11.

As shown in FIG. 9, the reinforcing bracket 27 is formed with the tool hole 51 through which to pass a nut fastening tool, so that the nut 75 on the circular plate 26 on which the reinforcing bracket 27 is placed can be rotated by the nut fastening tool.

Also, since the reinforcing bracket 27 is formed with the tool hole 52 through which to pass a nut fastening tool, the nut 44 for the suspension strut 34 (see FIG. 10) can be loosened without loosening the nuts 75 for the tower connecting bar 11.

Figure 10:
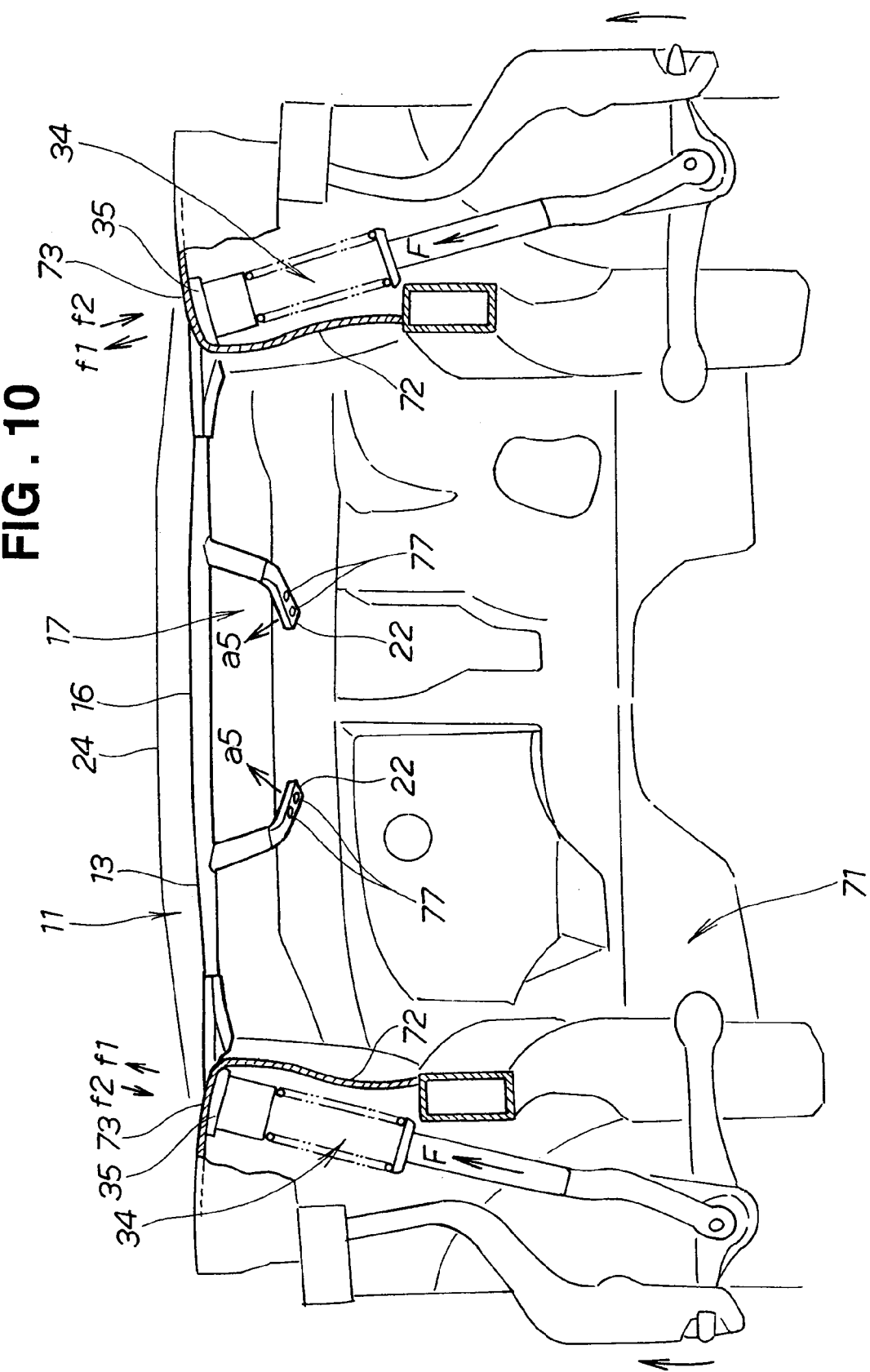
FIG. 10 is a diagram illustrating how loads applied to the right and left suspension struts are transmitted through branch pipes to a cowl.

This saves time in mounting and removing the tower connecting bar 11 or the suspension struts 34 (see FIG. 10).

Finally, as shown in FIG. 10, the distal ends 22, 22 of the branch pipes 17 attached to the pipe 13 are fixed to the cowl 24 below the windshield by bolts 77, 77. This completes the mounting of the tower connecting bar 11.

As described above, since the pipe 13 is provided with the branch pipes 17 attached to the middle 16, and the distal ends 22 of the branch pipes 17 are attached to the cowl 24 below the windshield, when loads F, F through the suspension struts 34, 34 are applied to the top plate portions 73, 73 of the strut towers 72, 72 of the vehicle body 71, the branch pipes 17 transmit the forces to the cowl 24 as shown by arrows a5, a5, increasing the strength of the tower connecting bar 11, and resultantly increasing the strengths of the strut towers 72, 72 of the vehicle body 71.

Figure 11:
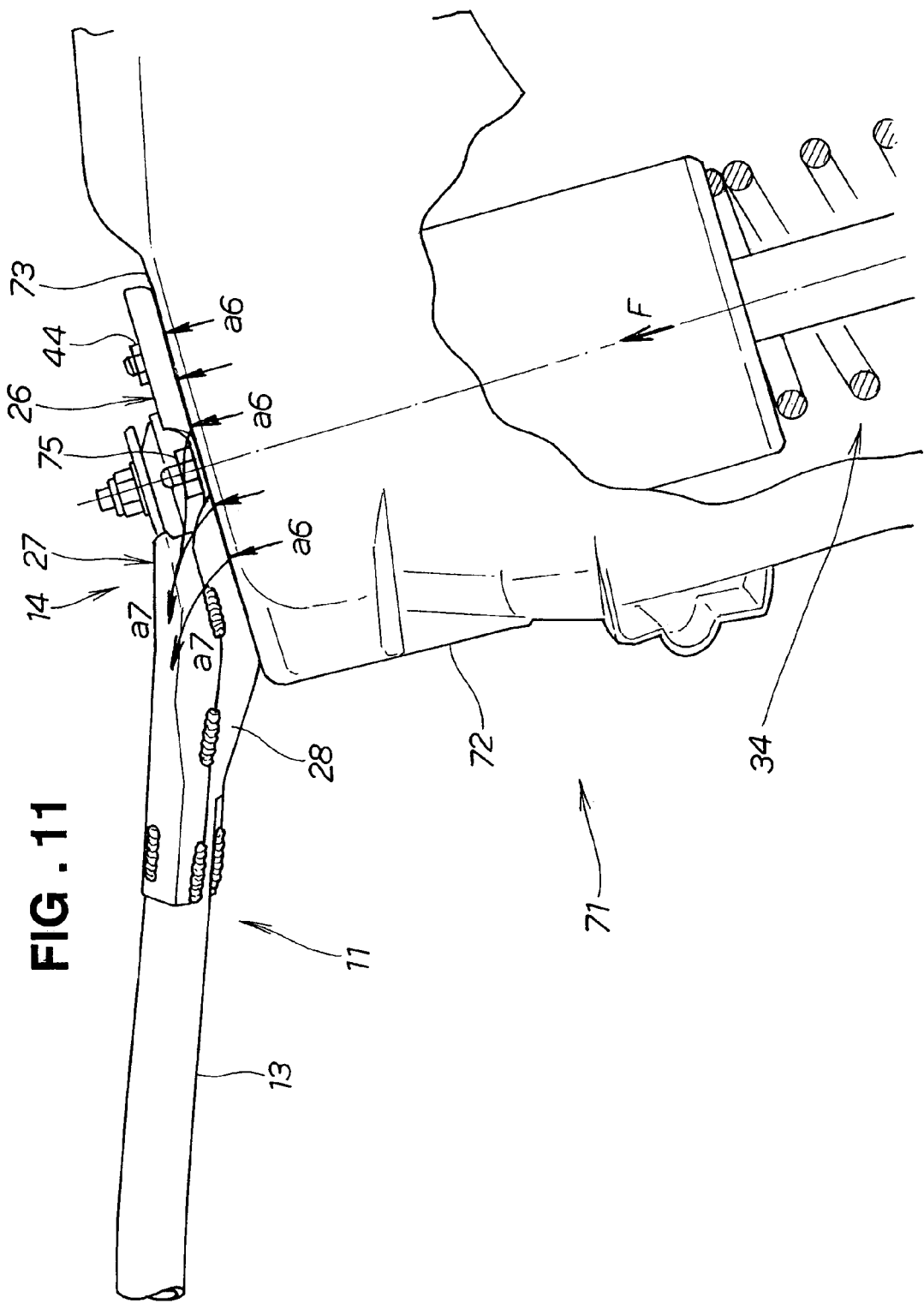
FIG. 11 is a diagram illustrating how a load applied to the suspension strut is transmitted to the tower connecting bar.
Figure 12:
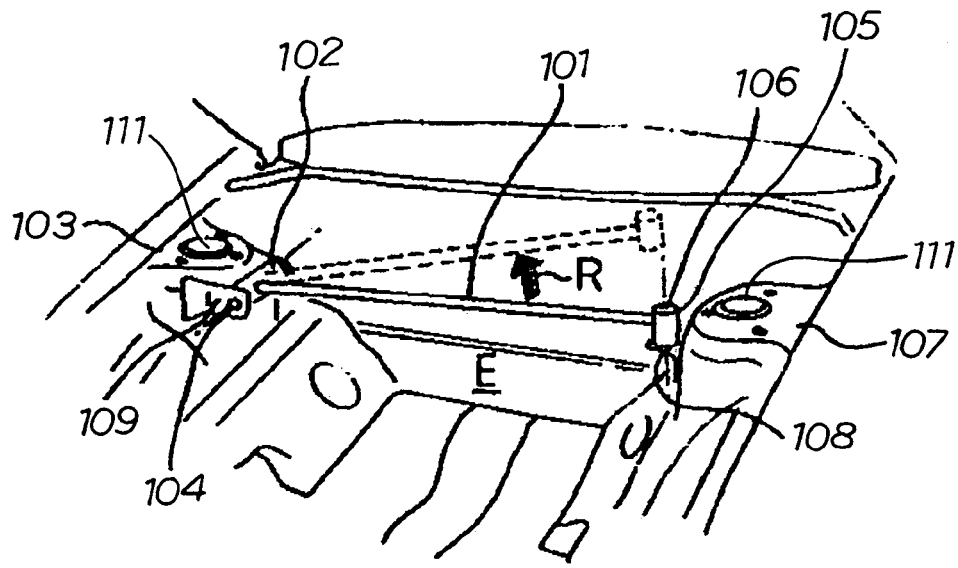
FIG. 12 is a diagram of a related-art performance rod mounting structure.
Figure 13:
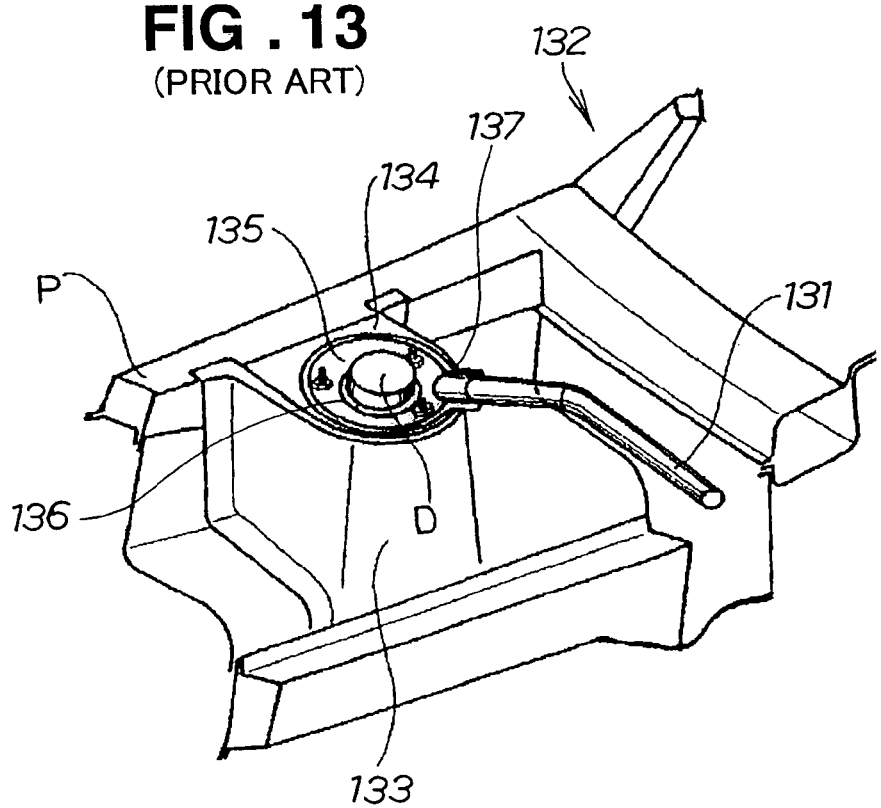
FIG. 13 is a diagram of another related-art performance rod mounting structure.

As shown in FIG. 11, when the load F through the suspension strut 34 is applied to the top plate portion 73 of the strut tower 72 of the vehicle body 71, the load is applied to the doughnut-shaped circular plate 26 of the bracket 14 as shown by arrows a6, and also transmitted from the circular plate 26 to the reinforcing bracket 27 as shown by arrows a7, a7, resulting in an increased strength of the bracket 14 (reduced stress).

Specifically, the tower connecting bar 11 has the substantially triangular reinforcing bracket 27 placed on the connection portion 28 between the pipe 13 and the circular plate 26 to increase the strength (section modulus) of the bracket 14 (circular plate 26) and to significantly reduce deflection produced in the connection portion 28 between the pipe 13 and the circular plate 26, and thus can efficiently receive the load F from the suspension strut 34.

The tower connecting bar structure of the present invention is applicable to three-wheeled vehicles as well as four-wheeled vehicles.

Obviously, various minor changes and modifications of the present invention are possible in the light of the above teaching. It is therefore to be understood that within the scope of the appended claims the invention may be practiced otherwise than as specifically described.

What is claimed is:

1. A tower connecting bar structure for connecting right and left strut towers on which bolts and nuts for suspension fastening are exposed, comprising:
   a tower connecting bar comprising a pair of right and left doughnut-shaped circular plates, and a pipe connecting the circular plates;
   wherein the circular plates have a plurality of bolt holes and a plurality of nut accommodating holes formed therein, said plurality of bolt holes being adapted to receive bolts for fastening the circular plates to the strut towers, said plurality of nut accommodating holes being adapted to receive nuts, said nut accommodating holes having a first diameter and the nuts having a second diameter, wherein the first diameter is greater than the second diameter.

2. The connecting bar structure as set forth in claim 1, wherein the bolt holes formed in one of the right and left circular plates are circular, and the bolt holes formed in the other circular plate are transversely elongated.

3. The connecting bar structure as set forth in claim 1, further comprising substantially triangular reinforcing brackets placed on connection portions disposed between the pipe and the circular plates, the reinforcing brackets having tool holes formed therein, the tool holes having a third diameter and being adapted to receive nut fastening tool therethrough to facilitate tightening and loosening of a subjacent nut.

4. The connecting bar structure as set forth in claim 1, further comprising branch pipes attached to the pipe at a location intermediate the circular plates, the branch pipes having distal ends that are adapted to be mounted to a cowl below a windshield.

* * * * *